Patented July 12, 1932

1,867,435

UNITED STATES PATENT OFFICE

SIDNEY T. ADAIR, OF BALTIMORE, MARYLAND, ASSIGNOR TO THE SILICA GEL CORPORATION, OF BALTIMORE, MARYLAND, A CORPORATION OF MARYLAND

METHOD OF PREPARING SOLID ADSORBENTS

No Drawing.    Application filed August 29, 1930. Serial No. 478,787.

The present invention relates to highly porous solid adsorbent materials and methods of preparing the same.

Among the solid adsorbents most commonly employed in industry are solid porous gel materials and activated carbon. Those gases or vapors which wet these materials are more efficiently adsorbed than those that do not. Water vapor wets silica gel easily whereas hydrocarbon vapors do not. On the contrary, activated carbon is more easily wetted by hydrocarbon vapors so that, from a mixture of water vapor and hydrocarbon vapors, silica gel will adsorb the water vapor in preference to the hydrocarbon whereas activated carbon will adsorb the hydrocarbon vapors in preference to the water vapor.

It is the principal aim of the present invention to obtain an adsorbent material which will have the adsorptive properties of both activated carbon and gels.

Briefly stated, the process of preparing such a product according to the present invention comprises impregnating an inorganic gel material with a solution of a substance capable of being converted into a highly activated carbon, and then treating the impregnated gel material so as to convert the substance into activated carbon.

The gel material employed may be the hydrogel or nearly dried hydrogel of silica, tungstia, titania, alumina, stannia, or gel materials consisting of two or more of said oxides. Preferably, the hydrogel or nearly dehydrated hydrogel of silica is employed.

The substance with which the gel material is treated, and capable of being converted into the activated carbon, may be any carbon bearing material such as waste sulphite liquor, molasses, or the residue obtained from fermentation of molasses or a carbohydrate such as starch, sugar and the like. It is preferred to use a carbohydrate, as it can be converted directly into a pure highly activated carbon which requires no subsequent purifying treatment. If other carbonaceous materials are employed, the activated carbon resulting therefrom must be treated to remove hydrocarbons and other objectionable substances. Two specific examples of processes of preparing the adsorbent according to the present invention are as follows:

*Example 1*

A batch of silica hydrogel (or any other hydrogel) prepared in any suitable manner, after being thoroughly washed with water, is immersed in a solution of a carbohydrate, such as a 10% cane sugar solution by weight, until the hydrogel has been thoroughly impregnated with the carbohydrate. Usually six hours is sufficient to accomplish this. The hydrogel is then removed from the sugar solution and allowed to drain, and superficially washed once with water so as to remove the sugar from the exterior surfaces only of the hydrogel. It is then dried as by passing air at a temperature of 100° C. over the same, which converts it into granules of hard vitreous material. The gel is then heated for about six hours in an oven at a temperature of about 315° C. in order to convert the sugar into activated carbon. The resulting product is a dried gel impregnated with activated carbon.

*Example 2*

A batch of nearly dried or dehydrated hydrogel (instead of the hydrogel containing 90% water, as specified in Example 1) is treated with a solution of a carbohydrate. Preferably a 10% solution by weight is employed and it may be sprayed over the granules of the dried gel or the dried gel may be immersed in the solution for a period of one hour or until the gel has adsorbed a sufficient amount of the solution to provide the necessary amount of activated carbon in the final product. If the gel is immersed in the solution, after it has adsorbed the necessary amount, it is removed and drained. Then the gel impregnated with the solution, whether it has been sprayed on the gel or whether it has been absorbed by immersion in a solution, is dried by passing air at a temperature of about 100° C. over the same for a period of about three hours. Thereafter the product is heated for about six hours in an oven at a temperature of about 315° C. to convert the carbohydrate into activated carbon. The resulting product is a dried gel impregnated with activated carbon.

The products obtained by the processes described in these examples are hard, highly porous, vitreous gels having activated carbon in the pores thereof and have the properties of both gels and adsorbent carbon in that they will adsorb hydrocarbon vapors of low boiling points as well as water vapor. In other words, the product according to the invention has some of the properties of both gels and activated carbons.

Having thus described the invention, what is claimed as new and desired to be secured by Letters Patent is:

1. The process of preparing a solid adsorbent consisting in impregnating gel material with a solution of a substance capable of being converted into a highly activated carbon, drying the impregnated material, and heating it to convert the said substance into activated carbon.

2. The process of preparing an adsorbent consisting in impregnating gel material with a solution of a carbohydrate, drying the impregnated material, and heating it to convert the carbohydrate into activated carbon.

3. The process according to claim 2 wherein the gel material is a hydrogel.

4. The process according to claim 2 wherein the gel material is a partially dehydrated hydrogel.

5. The process according to claim 2 wherein the gel material is silica hydrogel.

6. The process of preparing an adsorbent consisting in impregnating a hydrogel with a solution of a sugar, drying the impregnated hydrogel so as to convert it into a hard, porous gel, and heating the gel to convert the sugar into activated carbon.

7. The process of preparing an adsorbent consisting in impregnating a dried gel with a solution of a sugar, drying the impregnated gel, and heating it to convert the sugar into activated carbon.

In testimony whereof I hereunto affix my signature.

SIDNEY T. ADAIR.